July 29, 1969  J. A. JUHLIN  3,458,130
HOT AIR HEATING SYSTEM AND INDIVIDUAL NON-LEAKING
FILTERS FOR THE COLD AIR REGISTERS THEREOF
Filed June 1, 1967
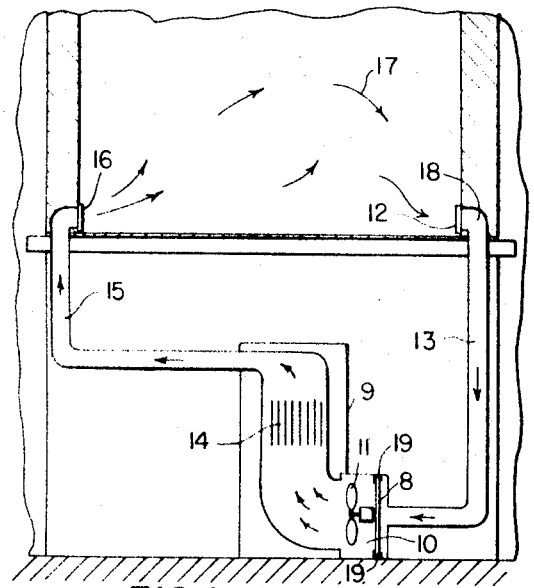
FIG. 1 (CONVENTIONAL)
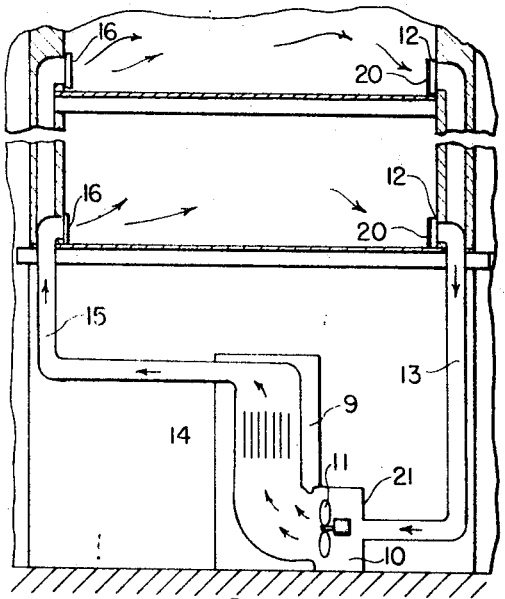
FIG. 2 (IMPROVED)
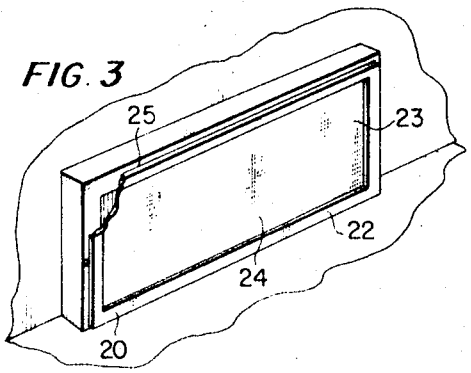
FIG. 3
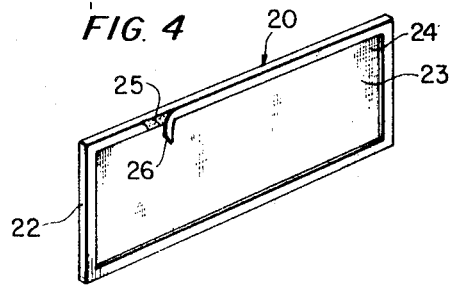
FIG. 4
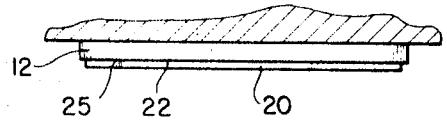
FIG. 5
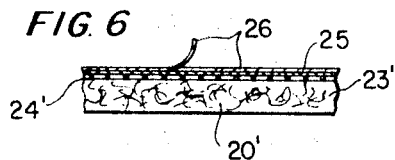
FIG. 6
INVENTOR:
JOHN A. JUHLIN United States Patent Office 3,458,130
Patented July 29, 1969

3,458,130
HOT AIR HEATING SYSTEM AND INDIVIDUAL NON-LEAKING FILTERS FOR THE COLD AIR REGISTERS THEREOF
John A. Juhlin, 3535 N. Rockton Ave., Rockford, Ill. 61103
Filed June 1, 1967, Ser. No. 642,784
Int. Cl. F24d 5/10; F24b 7/00
U.S. Cl. 237—53                                 8 Claims

ABSTRACT OF THE DISCLOSURE

In lieu of the conventional single relatively large filter removably disposed in the furnace, the same being loose for convenience of insertion and removal, this invention provides a relatively small filter fitting tightly on each of the individual cold air registers with a view to preventing leakage of dust laden air past the same and insuring cleaner air continuously by encouraging more frequent replacement of the filters in at least those rooms having the greatest traffic and consequently the worst dust problem, while also insuring generally improved heating efficiency by avoidance of obstruction to air flow resulting where the central filter gets clogged and is not replaced when that becomes necessary. The individual filters are exposed where they can be vacuum cleaned easily in the cleaning of rooms and are thus kept operating at highest efficiency, the same being also designed for quick and easy replacement and good sealing, thereby insuring that very little dust laden air escapes the filtering action.

This invention relates to hot air heating systems of the otherwise conventional type but improved from the filtering standpoint by the provision of relatively small individual non-leaking filters sealed about their marginal edges on all of the cold air registers, as distinguished from the conventional arrangement where usually only a single relatively large air filter is provided in the furnace set loosely in the cold air return next to the blower and therefore subject to leakage of dust laden air around it. This new arrangement, besides insuring more frequent replacement of the individual filters in at least those rooms having the greatest traffic and therefore the worst dust problem, and thereby insuring less obstruction to air flow and consequently greater heating efficiency all around, also insures cleaner air at all times, not only because the housewife can readily clean these exposed filters with her vacuum cleaner when doing her house cleaning at regular intervals, thus keeping these filters working at top efficiency but also because of the more frequent replacement of those individual filters that need it, and also because these individual filters have air-tight seals where they are mounted on the registers so there is little or no leakage of dust laden air past the filters. While a little more money may be spent with this new system by reason of the more frequent replacement of filters there is an ultimate substantial saving through the greatly increased efficiency of operation of the heating system, not to mention the savings surely resulting from the better health of all individuals involved by virtue of their breathing cleaner air throughout the heating season.

The invention is illustrated in the accompanying drawing, in which:

FIG. 1 is a vertical section through a building showing fairly diagrammatically a conventional hot air heating system with a single central air filter set loosely in the cold air return next to the blower for convenience in removal and replacement;

FIG. 2 is a similar section through the same system improved by the elimination of the faulty central air filter and the provision of individual smaller air filters mounted with air tight joints on all of the cold air registers, the section having an intermediate portion of the side walls of a lower or first floor room broken away to enable showing a lower portion of an upstairs room and its registers;

FIG. 3 is a perspective view of a typical cold air register with an air filter like that shown in perspective in FIG. 4 applied thereto, this being a form of filter utilizing pressure sensitive adhesive around the margins thereof exposed for use by removal of a covering strip, making it easy to stick the filter onto the housing of the register, as seen in FIG. 3 in perspective and in plan view in FIG. 5, and FIG. 6 is a top view of an end portion of another filter (frameless) adapted to be applied to the cold air registers in the same way as the filter of FIGS. 3–5.

Similar reference numerals are applied to corresponding parts throughout the views.

Referring first to FIG. 1, in which a relatively large single rectangular air filter 8 is shown in the hot air furnace 9 in the cold air return 10 next to the blower fan 11. This single filter is supposed to take care of the entire heating system. Cold air drawn from the rooms through registers 12 flows through cold air ducts 13 back to the furnace 9 and is filtered at 8, after which the air is circulated by the blower 11 through the heat exchange unit 14, and the hot air flows through the hot air ducts 15 into the various rooms of the house through the hot air registers 16.

With this conventional system, traffic in the various rooms stirs up dust and the dust laden air circulating, as shown by arrows 17, from the hot air registers 16 toward the cold air registers 12, flows into the cold air ducts 13, causing a considerable collection of dust on the inside thereof, mostly at 18 around the inlet end, the rest accumulating mostly in and around the filter 8. The filter 8, being down in the basement in the furnace, out of sight, usually gets clogged long before it is replaced with a fresh filter, resulting in dust passing through the filter and being recirculated in the hot air and coating the hot air ducts 15 and registers 16. Filters 8 are not designed to fit snugly in their guides 19, as that would make removal and replacement too difficult, so a considerable amount of dust laden air bypasses the loose filter, and it goes without saying that when the cold air ducts 13 get badly coated with dust and the filter 8 becomes clogged the entire system is truly in bad shape, not only from the standpoint that the air circulated is not clean and healthful to breathe but the air circulation is cut down by the dust obstruction, mainly in the filter 8, to the point where the heating efficiency of the furnace is greatly reduced. Hence the importance of filtering the dust out of the air in accordance with my invention by means of relatively small rectangular filters 20 provided in sealed relation to and on the individual cold air registers 12, as shown in FIG. 2, and omitting the single relatively large air filter 8 as indicated at 21 in FIG. 2, thereby obtaining the following advantages:

(1) The cold air returning to the furnace 9 is free of dust;

(2) There is no depositing of dust on the inside of the cold air ducts;

(3) There is no need for a large single filter 8 in the furnace 9, so, consequently, the fan 11 giving forced circulation operates at top efficiency;

(4) There is no discharge of dust with the warm air entering a room at 16;

(5) The speed of air flow through a cold air register's filter 20 is much lower than that through a large single filter 8 in the old system, and consequently the efficiency of filtering should be much higher with this new system;

(6) The new arrangement will give the housewife an opportunity to clean the filters 20 with her vacuum cleaner and do a better job than she could with the old arrangement if she bothered to remove the cold air registers and extend a suction tube into the cold air ducts;

(7) With individual filters 20, one can replace those that need replacement often enough instead of letting the whole system suffer through not replacing the single large filter 8 as often as it should be, and there is no excuse for overlooking the need for replacements occasionally;

(8) The present improvement makes for cleaner air throughout the heating season and that means better health and well being of all persons benefitted in this way, besides greatly reducing redecorating expenses as the dust and dirt that would otherwise either be breathed in or deposited on walls, if not deposited in the heating system, is removed whenever a dirty filter is removed, and (9) The present improvement is also useful when the central heating plant has air conditioning apparatus therein, because, there again there is the dust and dirt deposited on the filters in the circulation and re-circulation of air, and this also requires the occasional cleaning of the filters on the cold air registers.

Referring to FIGS. 3, 4, and 5, each of the filters 20 has a generally rectangular frame 22 made of cardboard or other suitable light and inexpensive as well as readily flexible and conformable material providing a channel in all four sides opening inwardly, in which the filtering material 23 usually retained between two spaced coarse screens 24 is mounted. Some filtering material is available also, as shown in FIG. 6, where the filter material 23' is of a uniform thickness and adheres to one side of the screen 24', and in the event that such material is used, the screen could be on the inside or the outside as preferred, since the material is not loose and does not require being retained between two screens. A big advantage in the use of such new material is that the filter 20 can be made thinner and, in fact, the frame 22 can be eliminated, as I have shown in FIG. 6, using the same pressure sensitive adhesive 25 around the marginal edges similarly as shown on the frame 22 in FIGS. 3–5, this pressure sensitive adhesive being protected by a removable covering strip 26 that is removed just prior to fastening a filter onto a cold air register, the adhesive adhering to the front face of the register housing around its open or louvered front. In that way, it is obvious, that I obtain a good air-tight seal around all four sides of a filter 20 or 20' and at the same time support the filter adequately on the register and yet not so tenaciously that it becomes any problem for the housewife to remove a filter when the same becomes unfit for further use and should be replaced in the interests of good filtering action and better efficiency of the heating system.

It is believed the foregoing description conveys a good understanding of the objects and advantages of my invention. The appended claims have been drawn to cover all legitimate modifications and adaptations.

I claim:

1. In a hot air heating system including a furnace having a blower therein, hot air registers and cold air registers provided in the various rooms of a building to be heated, hot air ducts extending from the furnace to the hot air registers, and cold air return ducts extending from the cold air registers back to the furnace, the improvement which consists of individual air filters disposed in sealed air-tight relationship to and removably mounted on the room side of individual cold air registers on the readily accessible outer surfaces thereof fully exposed to view in the various rooms as the sole means of filtering dust and dirt from the air circulated and recirculated through the rooms of the building via the hot air registers and cold air registers in the normal operation of the hot air furnace.

2. A hot air heating system as set forth in claim 1 wherein the marginal portion of each filter is secured to the housing of the cold air register around the open or louvered front thereof by adhesive serving the double purpose of sealing the joint and fastening the filter in place.

3. The construction as set forth in claim 2 wherein the filter comprises a retaining frame in which the filtering material for the filter is retained, the adhesive serving to secure the frame of the filter to the housing of the cold air register in sealed relationship thereto.

4. The construction as set forth in claim 2 wherein the filter comprises a retaining frame in which the filtering material for the filter is retained, the adhesive serving to secure the frame of the filter to the housing of the cold air register in sealed relationship thereto, the adhesive being of a pressure sensitive type with a protective covering strip over it, the removal of which protective covering strip exposes the adhesive to permit adhesion of the frame to the housing by application of pressure.

5. The construction as set forth in claim 2 wherein the filter comprises a sheet of filtering material of substantially uniform thickness, around the marginal edges of which adhesive is provided for adhesion of the filter sheet to the housing of a cold air register around the open or louvered front thereof in sealed relationship thereto.

6. The construction as set forth in claim 2 wherein the filter comprises a sheet of filtering material of substantially uniform thickness, around the marginal edges of which adhesive is provided for adhesion of the filter sheet to the housing of a cold air register around the open or louvered front thereof in sealed relationship thereto, the adhesive being of a pressure sensitive type with a protective covering strip over it, the removal of which protective covering strip exposes the adhesive to permit adhesion of the frame to the housing by application of pressure.

7. The construction as set forth in claim 2 wherein the filter comprises a sheet of filtering material of substantially uniform thickness, around the marginal edges of which adhesive is provided for adhesion of the filter sheet to the housing of a cold air register around the open or louvered front thereof in sealed relationship thereto, the sheet having a reinforcing screen of coarse mesh adhering to at least one face thereof and this screen having the adhesive applied to the marginal edge portions thereof.

8. The construction as set forth in claim 2 wherein the filter comprises a sheet of filtering material of substantially uniform thickness, around the marginal edges of which adhesive is provided for adhesion of the filter sheet to the housing of a cold air register around the open or louvered front thereof in sealed relationship thereto, the sheet having a reinforcing screen of coarse mesh adhering to at least one face thereof and this screen having the adhesive applied to the marginal edge portions thereof, the adhesive being of a pressure sensitive type with a protective covering strip over it, the removal of which protective covering strip exposes the adhesive to permit adhesion of the frame to the housing by application of pressure.

References Cited

UNITED STATES PATENTS

| 1,801,949 | 4/1931 | Broudy et al. |
| 1,896,700 | 2/1933 | Cross. |
| 2,204,732 | 6/1940 | Girstenbrel _____ 237—53 |
| 3,127,259 | 3/1964 | Boylan _____ 55—511 |

EDWARD J. MICHAEL, Primary Examiner

U.S. Cl. X.R.

55—511; 98—101